United States Patent [19]
Guiton

[11] Patent Number: 5,329,972
[45] Date of Patent: Jul. 19, 1994

[54] FIRE RESISTANT PLASTIC STRUCTURE

[75] Inventor: Jeremy D. L. Guiton, London, England

[73] Assignee: Shell Internationale Research Maatschappij B.V., The Hague, Netherlands

[21] Appl. No.: 616,925

[22] Filed: Nov. 21, 1990

Related U.S. Application Data

[63] Continuation of Ser. No. 274,141, filed as PCT/EP87/00152, Mar. 13, 1987, abandoned.

[51] Int. Cl.$^5$ .............................................. F16L 57/00
[52] U.S. Cl. .................... 138/103; 138/110; 138/113; 138/114; 138/148; 138/149; 138/178; 220/248
[58] Field of Search ............... 138/103, 108, 110, 111, 138/112, 113, 114, 115, 116, 148, 149, 178; 220/248, 88 R, 88 B, DIG. 1, DIG. 14, DIG. 23; 137/78.1, 334–340; 29/890.035, 890.036, 890.039, DIG. 1

[56] References Cited

U.S. PATENT DOCUMENTS

| | | | |
|---|---|---|---|
| H594 | 3/1989 | Adorjan | 138/113 |
| 1,765,946 | 6/1930 | Shea | 220/428 |
| 1,779,786 | 10/1930 | Unzue | 220/428 |
| 1,930,285 | 10/1933 | Robinson | 138/113 |
| 1,950,234 | 3/1934 | Ewertz | 220/428 |
| 2,184,380 | 12/1939 | Deikel | 220/428 |
| 2,404,418 | 7/1946 | Walker | 220/88.1 |
| 2,896,669 | 7/1959 | Broadway et al. | 138/113 |
| 3,193,919 | 7/1965 | Rouse | 138/113 X |
| 3,379,221 | 4/1968 | Harry et al. | 138/148 |
| 3,619,474 | 11/1971 | Beck | 138/113 |
| 3,626,986 | 12/1971 | Aarburg et al. | 138/116 |
| 3,779,282 | 12/1973 | Klees | 138/115 |
| 3,827,595 | 8/1974 | Reynolds | 220/DIG. 1 |
| 3,934,617 | 1/1976 | Henderson | 138/116 |
| 3,985,257 | 10/1976 | Shaffer et al. | 220/DIG. 1 |
| 3,987,926 | 10/1976 | Yavorsky | 220/DIG.1 |
| 4,025,675 | 5/1977 | Jonda | . |
| 4,033,381 | 7/1977 | Newman et al. | 138/113 |
| 4,215,727 | 8/1980 | Wijlen | 138/113 |
| 4,509,447 | 4/1985 | Smith | 138/113 |
| 4,691,741 | 9/1987 | Affa et al. | 138/113 |
| 4,779,652 | 10/1988 | Sweeney | 138/113 |
| 4,817,672 | 4/1989 | Broodman | 138/113 |

FOREIGN PATENT DOCUMENTS 3725563  2/1989  Fed. Rep. of Germany ... 220/DIG. 1
2038668 12/1970  France .

Primary Examiner—James E. Bryant, III
Attorney, Agent, or Firm—Jones, Tullar & Cooper

[57] ABSTRACT

A fire resistant plastic structure comprises a pair of parallel walls, wherein the spacing between the walls is filled with an array of mutually spaced strut elements, thereby providing a flow path for a cooling fluid throughout the spacing.

15 Claims, 4 Drawing Sheets

FIRE RESISTANT PLASTIC STRUCTURE

This is a continuation of co-pending application Ser. No, 07/274,141 filed as PCT/EP87/00152 on Mar. 13, 1987, now abandoned.

BACKGROUND OF THE INVENTION

The invention relates to a fire resistant structure comprising heat sensitive or combustible plastic materials. In general plastic items of structure are made of epoxy or polyester resins or other synthetic materials, wherein the wall of the structure may be reinforced by means of one or more fibrous layers.

Plastic materials find in an increasing amount application for constructing various items of structure, such as pipe-lines, storage tanks, lulls for ships, wall elements, etc.

In spite of various desirable properties of plastic materials for use in a marine environment, such as their corrosion resistance and light weight, conventional plastic structures are generally not accepted by Classification Societies and Regulatory Authorities for use in vital services in ships and on offshore platforms. The main reason for non-acceptance is the susceptibility of conventional plastic structures to fire damage.

Numerous attempts have been made to improve the fire resistance of plastic structures such as by covering the structure with insulating layers comprising fire proof coatings or claddings. Although these provisions enhance the fire resistance of the structure satisfactorily they have the inherent disadvantage that the cost and often the weight of the structure are considerably increased and that complex installation and inspection procedures are required.

SUMMARY OF THE INVENTION

An object of the invention is to provide a robust, light weight and fire resistant structure comprising plastic materials which requires only minor modifications to current fabrication and installation practices, and which is therefore little or no more expensive than a conventional structure comprising such materials.

A further object of the invention is to provide a fire resistant plastic structure which can be fabricated, without additional difficulty or expense, in flat, single or double curvature form, for example to conform to bulkhead, pipe or ship-shaped type constructions.

In accordance with the invention these objects are accomplished by a structure comprising a pair of plastic walls that are parallel to each other with a spacing therebetween and an array of strut elements arranged in the spacing, which elements are each at opposite sides thereof bonded to the walls, wherein said elements are arranged at selected mutual distances thereby providing rigid but permeable core throughout the spacing.

Preferably the strut elements consist of open or webbed box-like sections or of perforated I-shaped sections, that are each at opposite sides thereof bonded to the parallel walls of the structure to provide a rigid but highly permeable core in the spacing between the parallel walls of the structure.

It is furthermore preferred to arrange the strut elements on a flexible carrier cloth which is bonded to one of the walls by a suitable adhesive. Provided that the strut elements are mounted on the cloth at proper mutual spacings they will during construction of the structure, conform readily to any curvature of the walls.

The design of the double walled structure according to the invention is based on experience with plastic items of structure in actual fires and fire tests carried out with plastic pipes. These tests have shown that provided the plastic pipe wall is kept coo/. on the side remote from the fire, its good insulating properties will ensure that only the surface of the pipe which is exposed to the fire will burn, and that damage will generally be confined to a minor part of the wall thickness. Provided that the usual adequate strength margins are employed in the pipe design, sufficient sound material thus remains to enable the pipe to continue operating satisfactorily at its peak working pressure.

BRIEF DESCRIPTION OF THE DRAWINGS

The invention will now be described in detail with reference to the accompanying drawings, in which.

DETAILED DISCUSSION

In FIGS. 1-6 there is shown a fire-resistant plastic pipe embodying the invention. The pipe comprises an inner pipe wall 1 and an outer pipe wall 2 which walls are co-axially arranged with an annular space 3 therebetween. In the annular space 3 an array of strut elements 4 is mounted in a web-configuration to provide a permeable but rigid core spanning the width of the annular space 3.

Figure 1:
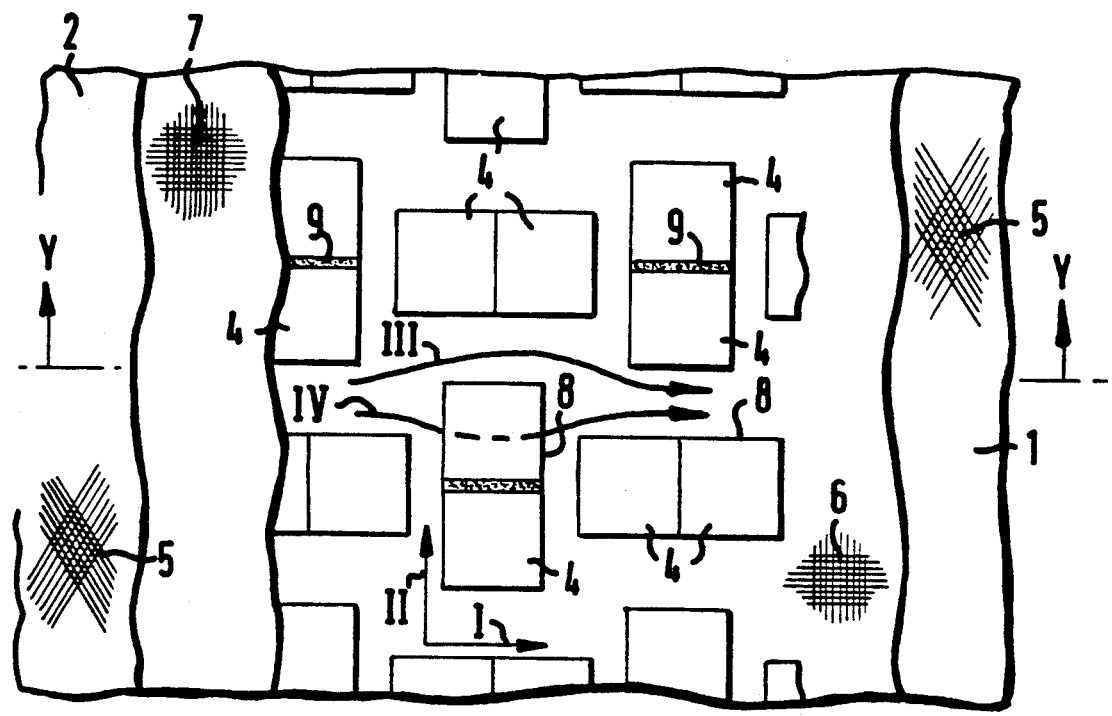
FIG. 1 is a cut-away view of a pipe embodying the invention showing the core arrangement in the annular space between the pipe walls.

As illustrated in FIG. 1 the plastic inner and outer walls 1 and 2 are made of an epoxy or polyester resin, reinforced by layers 5 of glass fibres. At the outer circumference of the inner pipe wall a carrier cloth 6 is arranged' to which the reinforcement elements 4 are bonded by a suitable adhesive. At the inner circumference of the outer pipe wall 2 a closing cloth 7 is arranged to provide a foundation for easily fabricating the outer pipe wall 2 around the core provided by the web-configuration of elements 4.

Figure 2:
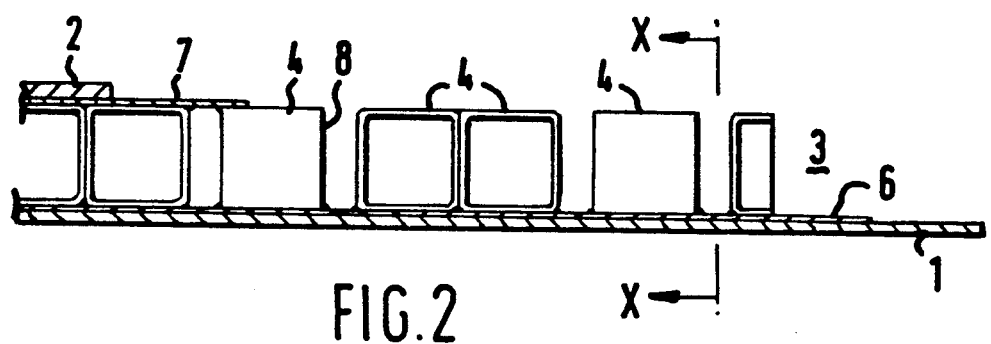
FIG. 2 is a sectional elevation of the pipe of FIG. 1 taken along line Y—Y and seen in the direction of the arrows.
Figure 3:
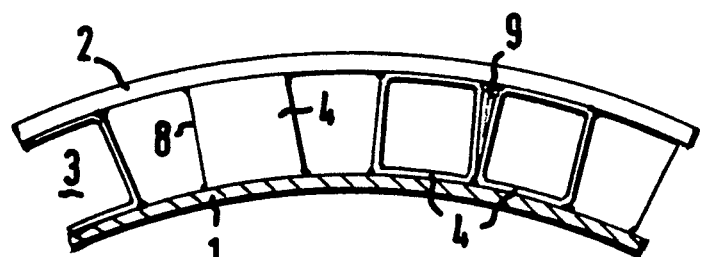
FIG. 3 is a sectional view of the pipe of FIG. 2 taken along line X—X and seen in the direction of the arrows.

As can be seen in FIGS. 2 and 3 the strut elements 4 consist of open box-like sections that are cut from a rectangular tube. The elements 4 are arranged in pairs and the elements 4 of each pair are arranged side by side and in such a manner that the open ends thereof lie in common planes 8. As illustrated in FIG. 1 the adjacent pairs of cubic elements 4 are arranged in a regular pattern and in such a manner that the common planes 8 of the open ends of adjacent pairs of elements 4 are alternatingly oriented in a longitudinal direction (see arrow I) and in tangential direction (see arrow II). The adjacent pairs of elements 4 are moreover arranged at regular intervals thereby providing a flow path via the spacings between the adjacent pairs of elements 4 (see arrow III) and via the interior of the elements 4 (see arrow IV). The spacing between the strut elements 4 enables the array of elements 4, when attached to the carrier cloth 6, to conform readily during lay-up to any subsurface, whether flat or of single or double curvature. In view of the permeability of the open-box like elements 4 the adjacent pairs of elements 4 can be arranged at short mutual intervals without impairing the permeability of the annular space for the cooling fluid which can be circulated through the annular space to provide necessary cooling of the outer pipe wall 2 in the event of fire. Similarly tile elements can all be oriented in one direction and be contiguous without impairing the permeability of tile annular space provided each web contains e.g. a centre or edge perforation. The location of the perforation at the web centre or edge will prevent an unacceptable strength loss. The arrangement of the adjacent pairs of elements 4 at short mutual intervals and in a web-configuration enables the elements 4 to perform as a hollow but structural core spanning the width of the annular space 3 via which core tension and/or compressive loads together with bending and shear loads exerted to either the inner or outer wall are transferred to the other wall thereby causing distribution of the load to both pipe walls. Since the inner and outer pipe wall 1 and 2 support each other if a load is exerted on one of the walls the pipe can be designed such that the thickness of each wall equals half of the wall thickness of a "conventional" single-wall pipe required to resist internal design pressure of the fluids transported via the pipe. Where a beam or panel structure is involved, e.g. a wall element, the combined thickness of sandwich face skin may be less than the thickness of a single skin design for equal strength and stiffness, in accordance with normal sandwich design theory, giving associated weight and cost savings.

To further enhance reinforcement provided by the elements 4 the adjacent side walls of each pair of elements may be bonded together by a suitable adhesive. In addition thereto, as illustrated in FIGS. 1 and 3, the wedge-shaped spacing between the adjacent side walls of the tangentially oriented pairs of elements may be filled with a reinforced filler 9 to further enhance the rigidity of the core provided by the elements 4.

Figure 4:
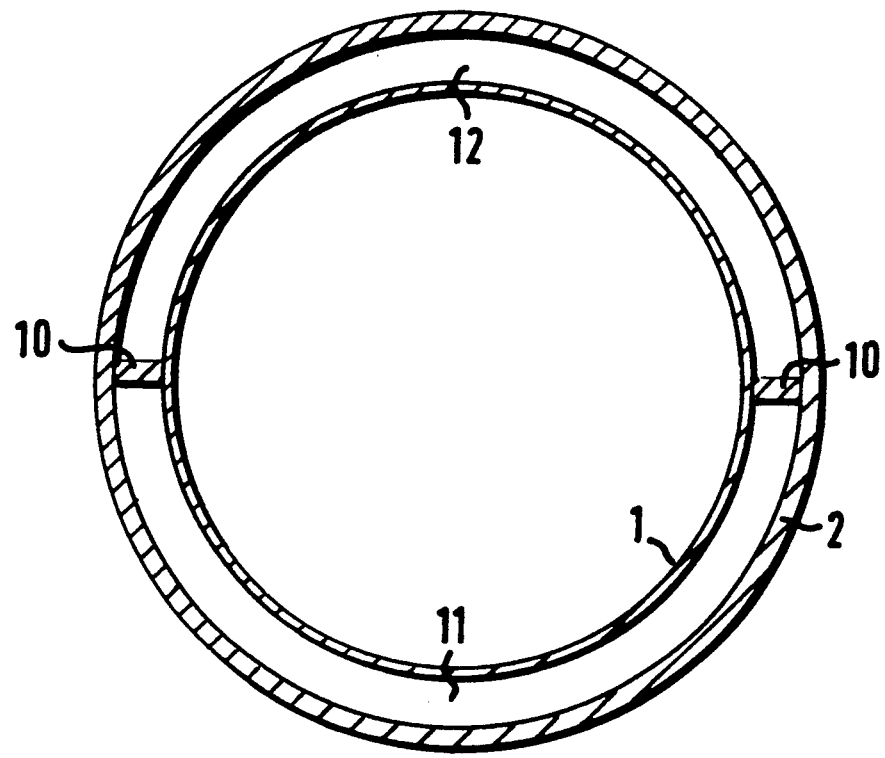
FIG. 4 is a cross-sectional view of the pipe of FIGS. 1-3 showing how the annular space between the pipe walls is divided into an outward and return flow path for circulating cooling fluid.
Figure 5:
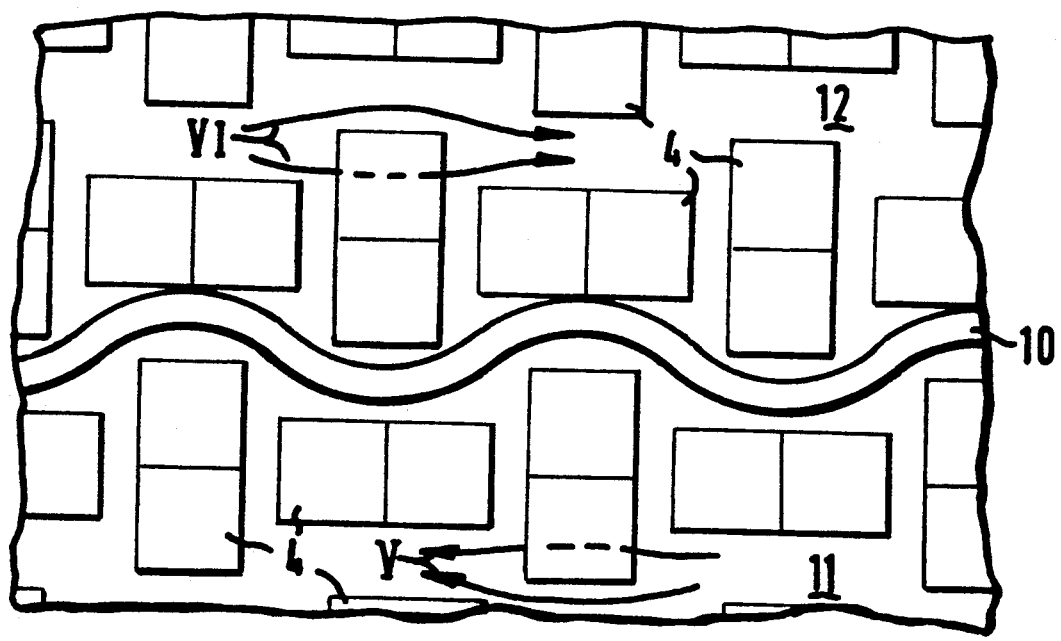
FIG. 5 is a side elevation of the pipe of FIG. 4 of which the outer wall is removed to show the partition of the annular space.

As illustrated in FIGS. 4 and 5 the annular space between the inner and outer pipe walls 1 and 2 may be divided by a pair of partitioning strips 10 into an outward flow path 11 and return flow path 12 for circulating cooling fluid therethrough in opposite directions as illustrated by arrows V and VI.

The strips 10 may be made of flexible elastomeric material and arranged along sinusoidal paths in the spacings between adjacent pairs of longitudinal and tangential elements, thereby further enhancing the rigidity of the pipe wall.

Figure 6:
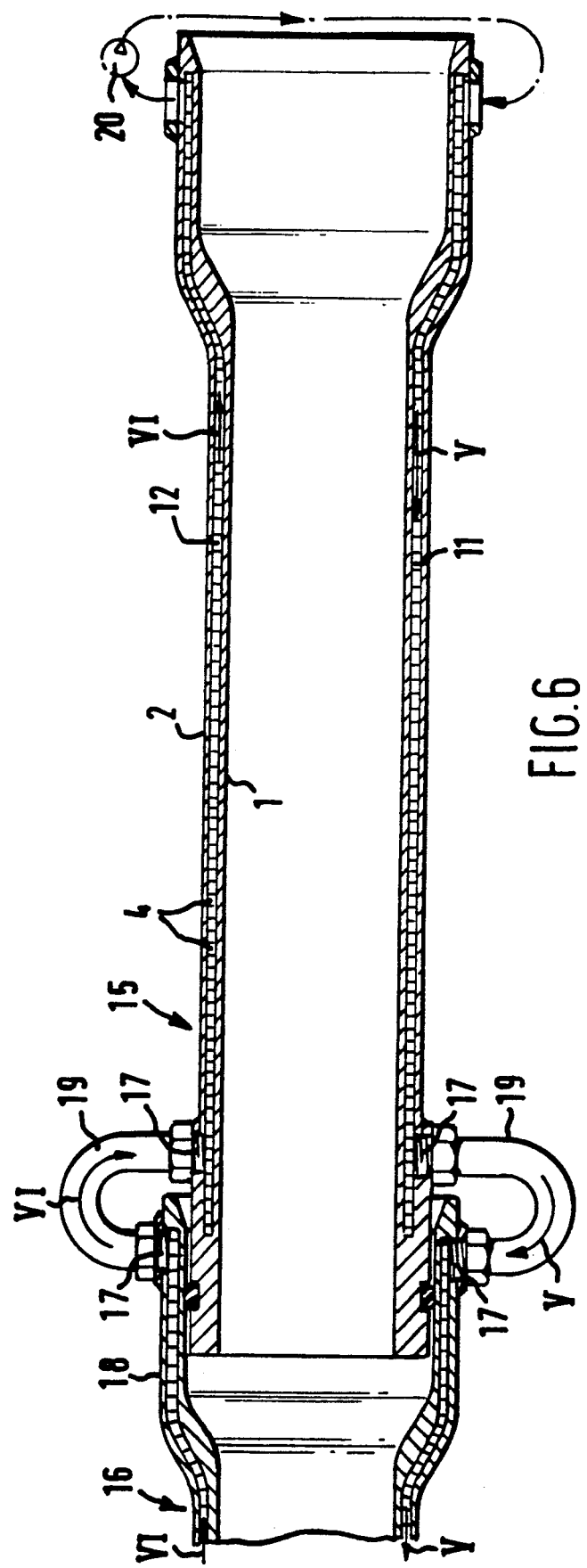
FIG. 6 is a longitudinal section of a string of pipes embodying the invention.

FIG. 6 illustrates how the outward and return flow paths 11, 12 of a series of interconnected pipes 15, 16 may be connected in fluid communication with each other. Thereto the outer pipe wall of each pipe 15, 16 is provided with fittings 17, such as threaded inserts as presently used for pressure tappings, in which an end of a U-shaped fire resistant tube 19 can be inserted.

By arranging tile fittings 17 of pipes provided with co-axial socket-sections 18 in the manner illustrated in FIG. 6 the hollow cores provided by the open-box elements 4 in the pipe wall form a continuous cooling layer thereby cooling the outer pipe wall 2 throughout the length of the pipe series. The cooling fluid may be circulated through the open box cores 18 by a circulation pump 20 (illustrated in phantom lines) which pumps the cooling fluid from the return flow path 12 into tile outward flow path 11 of a pipe at one end of the series in the directions indicated by arrows V and VI. By providing the pipe at the opposite end of the pipe series with a shunt conduit interconnecting the outward and return flow path thereof a closed circuit for circulating cooling fluid is created without requiring long supply or return pipes for closing the circuit.

The cooling fluid circulation system thus provided may further be used as a fire detection and/or leak detection system. If the circulating system is lightly pressurized to e.g. 2.5 bar then a sudden change of pressure will indicate leakage of either the inner or outer pipe wall. Furthermore contamination of the cooling fluid by pipe contents provides an indication of failure of the inner pipe wall.

Any suitable fluid or fluid mixture may be used as a cooling fluid. For many applications it is preferred to use water as cooling cooling fluid, provided that in cold climates an anti-freeze solution is added. For other applications it may be preferred to use a gaseous cooling fluid, such as a cold inert gas, e.g. cold nitrogen gas.

To achieve weight saving during normal service of the pipe the cooling fluid circulation system provided by the hollow core between the pipe walls may be left empty during normal service and only flooded with cooling fluid if smoke or fire detectors signal the existence of a fire. Moreover, the cooling fluid circulating system may be replaced by an open ended core flooding system through which in case of fire the cooling fluid is passed from a fluid supply at one end of the pipe series to openings arranged in the outer wall of a pipe at the other end of the pipe series. In this manner the presence of partitions to divide the annular space in outward and return flow paths can be avoided and hence further weight and cost savings can be achieved.

The pipe shown in FIGS. 1-6 may be manufactured in the following manner. First the inner pipe wall 1 is fabricated by e.g. helical or hoop and polar winding in the normal manner.

Then the open box core as shown in FIG. 1 is made up by bonding the elements 4, cut from, e.g. filament wound or extruded square or rectangular tube in the size and configuration shown, on to a woven glass or similar carrier cloth 6 or tape using "rigid" or flexible adhesive. The array of elements 4 provides adequate transverse and longitudinal web area together with adequate face wall/core bond area to resist shear stresses, and the back-to-back configuration of the elements 4 provides a balanced bond lay-out to resist any peeling forces which may be experienced due to deflection or impact loading in service. Core unit spacing is adjusted in this application to suit the different hoop and longitudinal strengths of the co-axial pipe walls 1 and 2.

The arrangement also provides core flexibility until installed, which allows the core/carrier cloth combination to conform to irregular substrate shapes and compound curvature, thus enabling the core to be applied over, e.g. socket ends of the pipe, curved pipe sections and curved surfaces generally.

Application to the inner pipe wall 1 is then achieved by winding the carrier cloth 6 down on to the pipe inner wall, using preferably mechanised application and cloth wetting from beneath, to give complete pipe coverage without overlap. Cloth wet-out may be assisted by inter-core brush stippling and core face rolling with metal or rubber consolidating roller if required.

A closing cloth 7 is then applied in a similar manner, the box core tops having been optionally pre-wetted with adhesive by e.g. mohair roller prior to the cloth either wet or dry being applied. If applied dry, pre-coating of the core tops with adhesive is essential, and a further stage of cloth wet-out will then be required. Another alternative would be to apply the closing cloth 7 in stiffer pre-impregnated fabric or even cured laminate form, to ensure it adopts a circular arc curvature between box core tops, and so provides a fair base for the outer skin windings, without flats. The objective of the two stage process would be to allow the use of two different possibly incompatible adhesives or resins for core/wall adhesion and for general laminating if desired, e.g. a flexible resin at core/wall interface for improved impact and peel resistance and a more rigid resin for the strength laminate. The use of different but compatible adhesives and resins where possible will allow a faster fabrication rate; also in some applications the use of the same resin as both adhesive and laminating resin may be practicable and desirable.

If an outward and return flow path for the cooling fluid within the core as illustrated in FIGS. 4 and 5 is required, this can be arranged by fitting the flexible, e.g. elastomeric dividing partitions 10 between the core boxes longitudinally, one on each side of the pipe say either with adhesive or while the resin is still wet, before the closing cloth 7 is applied.

After closing cloth application the core ends may be trimmed by a cutting disc with a fence set to prevent any penetration or severance of the inner pipe wall.

A sealing tape will then be laminated into a "Z" configuration over the open ends of the core, and the opening partly sealed by helical or hoop winding of rovings. This process may be repeated several times to complete core end closure.

Subsequently the outer pipe wall 2 is fabricated by e.g. helical or hoop and polar filament winding of glass rovings in the normal manner.

Finally cooling fluid inlet and outlet fittings 17 are screwed into bores made in the outer wall 2 near the ends of the pipe.

Figure 7:
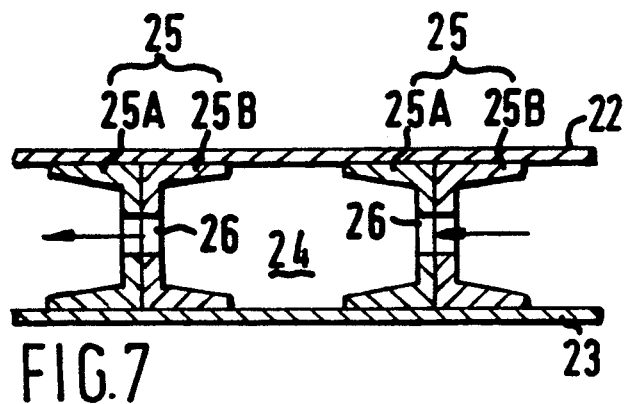
FIG. 7 is a sectional view of another fire resistant structure embodying the invention.
Figure 8:
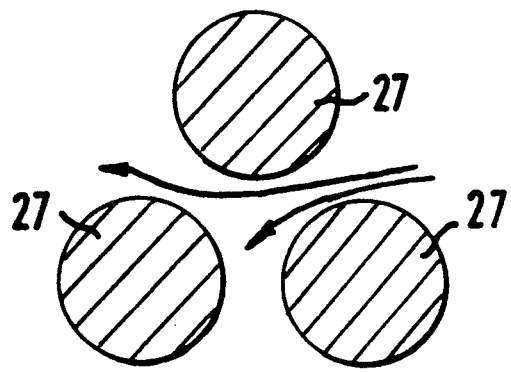
FIG. 8 shows schematically a core consisting of cylindrical studs in a fire resistant structure embodying the invention.
Figure 9:
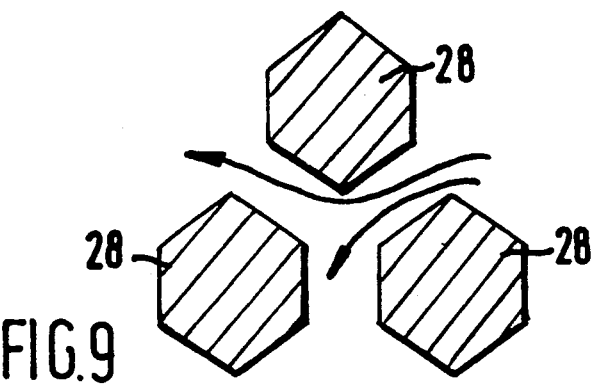
FIG. 9 shows schematically a core consisting of prismatic studs in a fire resistant structure embodying the invention.

FIGS. 7-9 show alternative embodiments of a rigid but permeable core in a fire resistant structure according to the invention.

In FIG. 7 there is shown a structure comprising a pair of parallel walls 22, 23 with an annular space 24 therebetween, in which space 24 a core is provided by a plurality of I-shaped strut elements 25. Each element 25 may be a one piece unit or may consist of a pair of interbonded C-shaped sections 25 A, 25 B arranged in a back-to-back configuration. Furthermore each element 25 is provided in the middle thereof with a perforation 26 to provide a flow path for cooling fluid as schematically indicated by the arrow. If desired the perforated strut elements 25 may instead of the parallel configuration shown in FIG. 7, be arranged in any other suitable pattern such as in a webbed or contiguous configuration.

In FIGS. 8 and 9 there are shown cores consisting of solid struts. The struts 27 shown in FIG. 8 have a cylindrical shape, whereas the struts 28 shown in FIG. 9 have a prismatic shape. The struts 27 and 28 are arranged at selected mutual distances to provide a flow path for cooling fluid (indicated by the arrows) through the spacing between the struts.

The fire resistant structure according to the invention is suitable for use in all plastic constructions where fire protection is needed, such as in fluid transfer pipes having rectangular or circular shape or in large diameter pressure or storage vessels. Besides use of the structure in ships and on offshore platforms, the structure may also find application in onshore constructions where fire resistance is required.

The invention has been illustrated in FIGS. 1–6 of the drawings with reference to a pipe designed in accordance with the invention. It is to be understood that the invention is not limited to tubular items of structure, but may also find application in any other item of structure having flat or curved plastic walls such as plastic hulls and decks for ships, plastic wall and roof elements, electrical panels, etc.

I claim:

1. A fire resistant structure comprising:
   a pair of parallel walls of combustible plastic with a spacing therebetween;
   an array of strut elements arranged at selected mutual distances in said spacing to form a rigid but permeable core throughout said spacing, each said strut element being bonded at their opposite sides to respective ones of said walls which array of strut elements is bonded to at least one of said walls by means of a flexible carrier cloth which is impregnated by an adhesive;
   a fluid inlet passing through one of said walls;
   a fluid outlet passing through one of said walls; and
   means for pumping cooling fluid from the fluid inlet through said spacing towards the fluid outlet.

2. The structure of claim 1, wherein each of said strut elements is made permeable in a direction parallel to said walls.

3. The structure of claim 1, wherein the strut elements consist of perforated I-shaped elements which are each either one-piece items or built up of a pair of interbonded C-shaped sections arranged in a back-to-back configuration.

4. The structure of claim 1, wherein the strut elements consist of solid struts.

5. The structure of claim 2, wherein the strut elements comprise box-like sections that are cut from a rectangular tube, said strut elements each having open ends.

6. The structure of claim 5 wherein the elements are arranged in pairs in such a manner that the elements of each pair are arranged side by side and with the open ends thereof lying in a common plane.

7. The structure of claim 6, wherein adjacent pairs of elements are alternatingly oriented in orthogonal directions.

8. The structure of claim 2, wherein at least one partitioning strip is arranged in said spacing in a direction parallel to said walls, thereby providing a plurality of flow paths for cooling fluid through said spacing.

9. The structure of claim 8, wherein the structure is a pipe with co-axial inner and outer walls and said spacing is provided by the annular space between the co-axial pipe walls, said annular space being divided into an outward and return flow path for cooling fluid by means of a pair of partitioning strips extending in a substantially longitudinal direction through the annular space at opposite sides of the pipe.

10. The structure of claim 6, wherein at least one partitioning strip is arranged in said spacing in a direction parallel to said walls, thereby providing a plurality of flow paths for cooling fluid through said spacing.

11. The structure of claim 10, wherein the structure is a pipe with co-axial inner and outer walls and said spacing is provided by the annular space between the co-axial pipe walls, said annular space being divided into an outward and return flow path for cooling fluid by means of a pair of partitioning strips extending in a substantially longitudinal direction through the annular space at opposite sides of the pipe.

12. The structure of claim 7, wherein at least one partitioning strip is arranged in said spacing in a direction parallel to said walls, thereby providing a plurality of flow paths for cooling fluid through said spacing.

13. The structure of claim 12, wherein the structure is a pipe with co-axial inner and outer walls and said spacing is provided by the annular space between the co-axial pipe walls, said annular space being divided into an outward and return flow path for cooling fluid by means of a pair of partitioning strips extending in a substantially longitudinal direction through the annular space at opposite sides of the pipe.

14. The structure of claim 1, wherein at least one partitioning strip is arranged in said spacing in a direction parallel to said walls, thereby providing a plurality of flow paths for cooling fluid through said spacing.

15. The structure of claim 14, wherein the structure is a pipe with co-axial inner and outer walls and said spacing is provided by the annular space between the co-axial pipe walls, said annular space being divided into an outward and return flow path for cooling fluid by means of a pair of partitioning strips extending in a substantially longitudinal direction through the annular space at opposite sides of the pipe.

* * * * *